(12) United States Patent
Tsuyuguchi

(10) Patent No.: US 6,173,363 B1
(45) Date of Patent: Jan. 9, 2001

(54) DATA TRANSMISSION DEVICE FOR READING DATA FROM A MEMORY MEDIUM AND TRANSMITTING THE DATA TO A MAGNETIC REPRODUCING APPARATUS WITH A REDUCED NOISE

(75) Inventor: Hiroshi Tsuyuguchi, Tokyo (JP)

(73) Assignee: TEAC Corporation, Tokyo (JP)

( * ) Notice: Under 35 U.S.C. 154(b), the term of this patent shall be extended for 0 days.

(21) Appl. No.: 09/152,018

(22) Filed: Sep. 11, 1998

(30) Foreign Application Priority Data

Sep. 12, 1997 (JP) .................................................... 9-249005

(51) Int. Cl.⁷ ...................................................... G06F 12/08
(52) U.S. Cl. .............................. 711/115; 360/55; 360/65; 360/66; 711/112; 711/2; 710/13; 710/65
(58) Field of Search .................................... 711/115, 112, 711/2; 360/55, 65, 66; 710/13, 65

(56) References Cited

U.S. PATENT DOCUMENTS

| | | | |
|---|---|---|---|
| 5,361,173 | * 11/1994 | Ishii et al. | 360/27 |
| 5,457,590 | 10/1995 | Barrett et al. | |
| 5,574,859 | 11/1996 | Yeh . | |
| 5,584,043 | 12/1996 | Burkart . | |
| 5,666,495 | 9/1997 | Yeh . | |
| 5,734,860 | * 3/1998 | Kondo | 711/115 |
| 5,778,421 | * 7/1998 | Nagano et al. | 711/115 |
| 5,802,325 | * 9/1998 | Roux | 710/102 |
| 5,887,145 | * 3/1999 | Harari et al. | 710/102 |

FOREIGN PATENT DOCUMENTS

| | | |
|---|---|---|
| 2-11597 | * 1/1990 | (JP) . |
| 7 192451 | * 7/1995 | (JP) . |
| WO 93/09501 | 5/1993 | (WO) . |
| WO 94/09449 | 4/1994 | (WO) . |
| WO 95/22096 | 8/1995 | (WO) . |
| WO 97/07481 | 2/1997 | (WO) . |
| WO 98/11497 | 3/1998 | (WO) . |

* cited by examiner

*Primary Examiner*—John W. Cabeca
*Assistant Examiner*—Christian P. Chace
(74) *Attorney, Agent, or Firm*—Anderson, Kill & Olick P.C.

(57) ABSTRACT

A data transmission device which can read information on an IC card without changing a structure of a conventional floppy disc drive is provided. The IC card includes memory elements for storing information therein. The IC card is accommodated in the data transmission device and the data transmission device is attached to the floppy disc drive so that data stored in the IC card is read via the floppy disc drive. The IC card is electrically connected to the data transmission device. A magnetic head core unit of the data transmission device is magnetically connected to a magnetic head of the floppy disc drive so as to transmit data to the floppy disc drive via the magnetic head. A waveform of data read from the IC card is changed to a waveform which is conformable to a reproduction characteristic of the floppy disc drive.

7 Claims, 10 Drawing Sheets

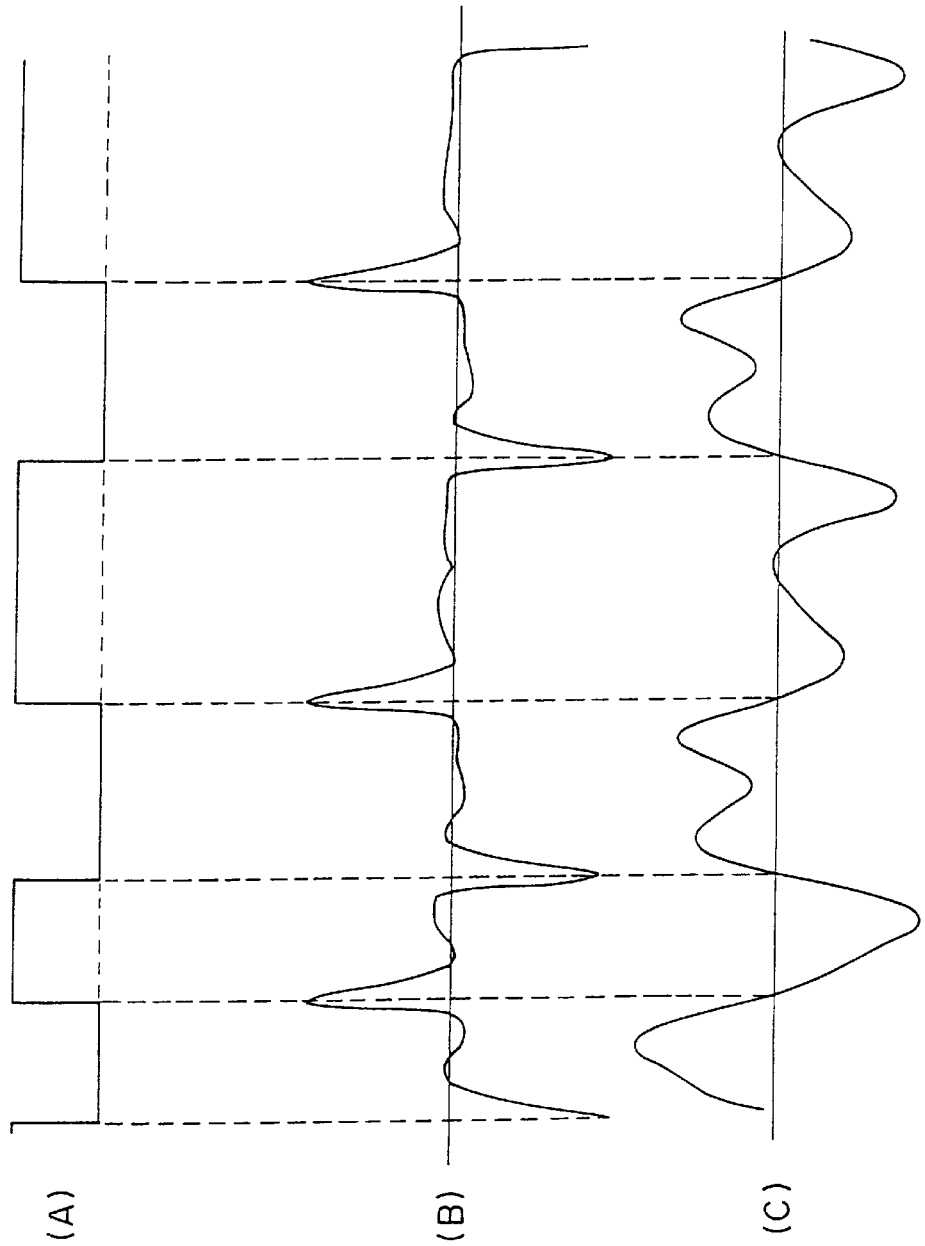

FIG. 6A
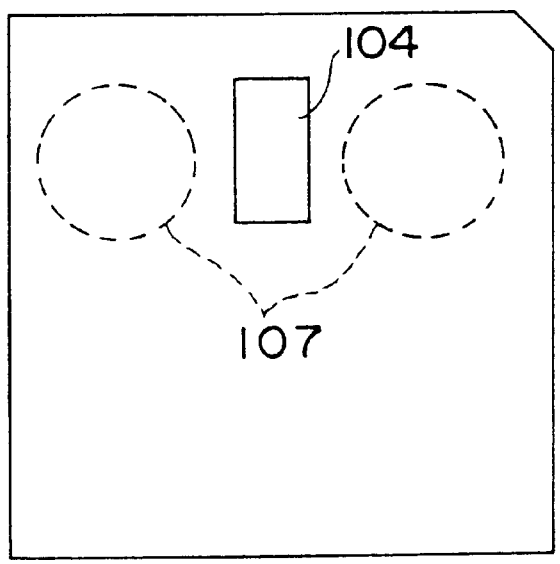
FIG. 6B
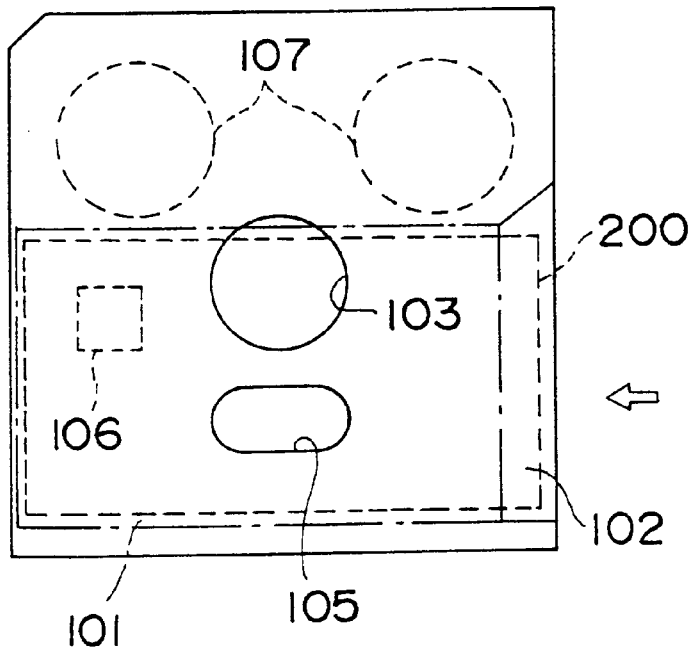
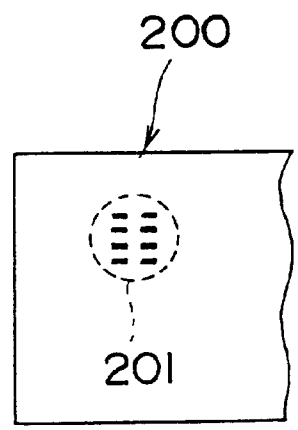

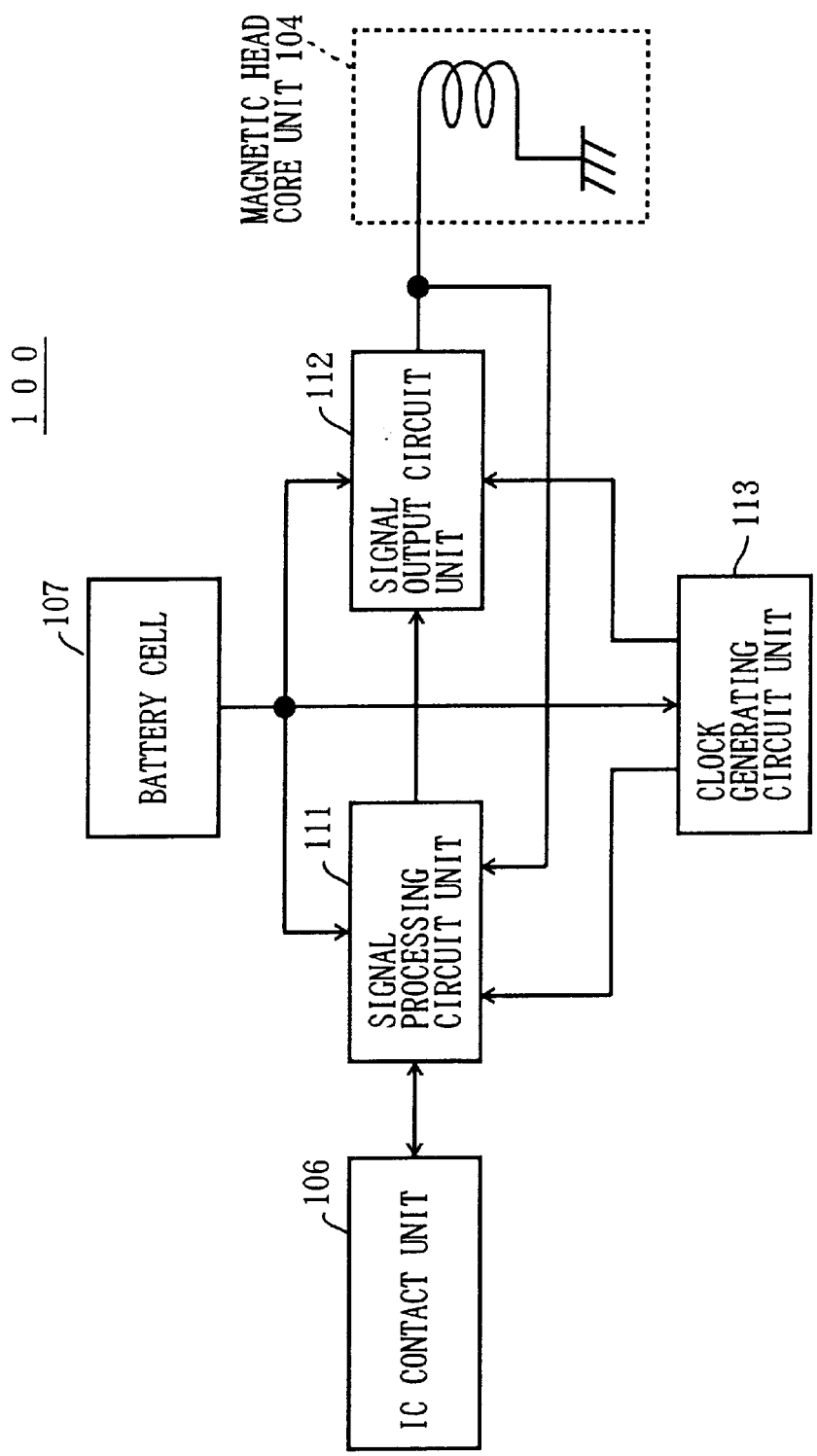

DATA TRANSMISSION DEVICE FOR READING DATA FROM A MEMORY MEDIUM AND TRANSMITTING THE DATA TO A MAGNETIC REPRODUCING APPARATUS WITH A REDUCED NOISE

BACKGROUND OF THE INVENTION

1. Field of the Invention

The present invention relates to a data transmission device and, more particularly, to a data transmission device which can be attached to a magnetic recording and reproducing apparatus performing a data recording or reproducing operation on a recording medium by using a magnetic recording and reproducing head, a memory medium being accommodated in the data transmission device so that a recording or reproducing operation on the memory medium is performed via the magnetic recording and reproducing apparatus, the memory medium having memory elements for storing information therein.

2. Description of the Related Art

A memory card is popular as a memory mainly for portable computers such as a notebook-type PC (personal computer). In association with downsizing of PCs and popularization of digital cameras, a small memory card has become popular in the market.

There are several types of small memory cards such as a miniature card type or a smart media type, and small memory cards having a memory capacity of 2 MB to 8 MB have come into a wide use in the market. Recently, an IC card having a memory capacity for storing a relatively small amount of data such as individual information or identification information (ID) has become popular.

However, in order to store information in such a small-type memory card or an IC card, a recording and reproducing apparatus exclusive for each medium is required. Accordingly, such an exclusive recording and reproducing apparatus must be connected to a conventional personal computer when the memory card is used with the conventional personal computer. Additionally, a space must be reserved inside the personal computer when the exclusive recording and reproducing apparatus is incorporated into the personal computer.

This is contrary to a trend of downsizing of the personal computer. Accordingly, it is suggested that a method for using a floppy disc drive as a recording and reproducing apparatus be used for recording or reproducing the IC card since the floppy disc drive is popular in the personal computer market and is incorporated in most personal computers as a data storing medium.

The basic concept of such a technology to permit usage of the small-type memory card or the IC card by the floppy disc drive is that no change should be made to the conventional floppy disc drive. That is, considering the popularization of the floppy disc drive on the market, the use of the conventional floppy disc drive has an advantage. Accordingly, a method has been developed in which the small-type memory card or the IC card is attached to an adapter having an outside configuration similar to the floppy disc cartridge so that the adapter is attached to the floppy disc drive, and, thereby, the memory card or the IC card is magnetically connected to the floppy disc drive via a magnetic head of the floppy disc drive so as to exchange signals therebetween.

FIG. 1 is a block diagram of a conventional floppy disc drive.

A floppy disc 2 is inserted into the floppy disc drive 1. A slide shutter 4 of the floppy disc 2 is opened by a loading mechanism 3 during an insertion of the floppy disc 2, and, thereby, a magnetic head 6 contacts a disc 5 accommodated in the floppy disc 2.

When the floppy disc 2 is loaded at a predetermined loading position inside the floppy disc drive 1, a spindle motor 7 is engaged with the disc 5. The disc 5 is rotated by the spindle motor 7 in a direction indicated by an arrow A at a predetermined speed, and the magnetic head 6 slides on the disc 5 so that data is recorded by magnetizing the disc 5 by the magnetic head 6.

The magnetic head 6 is mounted on an actuator 8, and is moved in a radial direction (direction of an arrow B) of the disc 5. Data is recorded on the disc 5 by moving the magnetic head 6 in a radial direction (direction of the arrow B) by operating the actuator 8.

The spindle motor 7 is connected to a motor control circuit 9 so as to be rotated at a constant rotational speed. The motor control circuit 9 is connected to a control circuit 10 so as to control an operation of the spindle motor 7 in response to a motor control signal provided from the control circuit 10.

The actuator 8 is connected to the control circuit 10. The actuator 8 moves the magnetic head 6 in a radial direction (direction of the arrow B) of the disc 5 in response to a tracking position control signal so as to select a tracking position.

Additionally, the magnetic head 6 is connected to a read/write circuit 11 so as to record data on the disc 5 by a recording signal provided from the read/write circuit 11. The magnetic head 6 also detects information recorded on the disc 5 by converting changes in magnetization of the disc 5 into a current. The read/write circuit 11 amplifies write data and provides the amplified write data to the magnetic head 6. The read/write circuit also restores an original signal by processing read signals.

A description will now be given, with reference to FIG. 2, of the read/write circuit 11.

FIG. 2 is a block diagram of the read/write circuit 11 of the conventional floppy disc drive 1.

The read/write circuit 11 comprises a flip-flop 21 which hold the write data; a write amplifier 22 which amplifies the data held by the flip-flop 21; a preamplifier 23 which amplifies read signals detected by the magnetic head 6; a low-pass filter 24 which cuts off a high-frequency component of read signals amplified by the per-amplifier 23; a differentiating circuit 25 which differentiates the read signals output from the low-pass filter 24; a zero-cross comparator 26 which detects a zero-crossing point of the differentiated signal output from the differentiating circuit 25; and a waveform shaping circuit 27 which shapes an output waveform of the zero-crossing comparator 26. The waveform shaping circuit 27 includes a time domain filter (TDF) 25 which removes a noise component from the output signal of the zero-cross comparator 26.

A description will now be given, with reference to FIG. 3, of an operation of the read/write circuit 11.

FIG. 3 is a waveform chart of an operation of the read/write circuit of the conventional floppy disc drive. FIG. 3-(A) shows the write data provided to the flip-flop 21; FIG. 3-(B) shows output data of the flip-flop 21; FIG. 3-(C) shows a head write current; FIG. 3-(D) shows a state of magnetization of the disc 5; FIG. 3-(E) shows a head read voltage detected by the magnetic head 6; FIG. 3(F) is an output of the differentiating circuit 25; FIG. 3(G) shows an output of the comparator 26; and FIG. 3-(H) is an output of the waveform shaping circuit 27.

The write data shown in FIG. 3-(A) is held by the flip-flop 21 as shown in FIG. 3-(B), and is converted into a waveform which can easily magnetize the disc 5. The signal shown in FIG. 3-(B) is provided to the magnetic head 6 as a write signal which has a waveform as shown in FIG. 3-(D) so as to magnetize the disc 5. It should be noted that the disc 5 is magnetized as shown in FIG. 3-(D) by the waveform shown in FIG. 3-(C).

When a magnetization pattern shown in FIG. 3-(D) is scanned by the magnetic head 6, a voltage shown in FIG. 3-(E) is obtained. At this time, the magnetic head 6 generates a current at positions where the magnetization is changed. The read voltage of the magnetic head 6 is influenced by a state of the immediately preceding magnetization, and shows relatively gentle changes as shown in FIG. 3-(E). The read voltage generated by the magnetic head 6 is differentiated by the differentiating circuit 25, and the signal shown in FIG. 3-(F) is obtained. At this time, since the read voltage generated by the magnetic head 6 gently changes as shown in FIG. 3-(E), the signal obtained by the differentiation has relatively small flat portions as shown in FIG. 3-(F).

The signal shown in FIG. 3-(F) is subjected to a detection of a zero-crossing point by the zero-crossing comparator 26, and a waveform shown in FIG. 3-(G) is obtained. This waveform corresponds to a result of detection of peaks in the read voltage shown in FIG. 3-(E). That is, pulses which reverse at positions where the magnetization of the disc 5 is changed are detected.

By generating pulses at reversed positions of the output of the comparator 26, an original signal shown in FIG. 3-(A) is restored as shown in FIG. 3-(H).

The above-mentioned modulation method is referred to as a Modified Frequency Modulation (MFM) method, and is generally used for the conventional floppy disc.

In such a modulation method, a resolution of data reproduction greatly influences a reading operation of data recorded on the disc 5. For example, when a plurality of pulses are read, a solitary wave is obtained by a combination of a positive polarity and a negative polarity which combination corresponds to a reverse in the magnetization on the disc 5. At this time, if adjacent solitary waves are too separate from each other or too close to each other, a degree of change in a root of the solitary wave in the read voltage shown in FIG. 3-(E) is reduced. The root of the solitary wave is referred to as a shoulder which is indicated by a dashed circle in FIG. 3(E). When the signal having a shoulder which has less change is differentiated, a saddle noise is generated in the shoulder as indicated by a dashed circle in FIG. 3-(F). If the saddle noise crosses a reference level (OV), the zero-crossing comparator 26 detects the saddle noise which may result in generation of a pulse which is not present in the original signal. Especially, since a floppy disc is rotated at a constant speed in the floppy disc drive, recording density differs from an inner side to an outer side of the disc, and, thereby, the shoulder is elongated in the outer side of the floppy disc. Accordingly, the above-mentioned influence of the saddle noise is increased in the outer side of the floppy disc.

In order to solve the above-mentioned problem in the floppy disc drive, the saddle noise is removed by using the time domain filter (TDF) 28 or the resolution is adjusted to fall within an optimum range by changing a read filter between the inner side and the outer side of the disc.

A description will now be given of a case in which information is recorded on or reproduced from the memory card (IC card) by the floppy disc drive.

FIG. 4 is a block diagram of a structure for providing data via the magnetic head of the conventional floppy disc drive. In FIG. 4, parts that are the same as the parts shown in FIG. 2 are given the same reference numerals, and descriptions thereof will be omitted.

When information is recorded on or reproduced from the memory card (IC card), the magnetic head 6 of the floppy disc drive 1 is contacted by a magnetic head core 31 so as to magnetically input and output information. In this case, an output of the IC card includes square waves, and the square waves are provided to the magnetic head 6 of the floppy disc drive.

FIG. 5 is a waveform chart of an operation for providing data via the magnetic head of the conventional floppy disc. FIG. 5-(A) shows data provided to the magnetic head core 31; FIG. 5-(B) shows a read voltage of the magnetic head 6; and FIG. 5-(C) shows an output waveform of the differentiating circuit 25.

When the data shown in FIG. 5-(A) is directly provided to the magnetic head core 31 so as to read the data by the magnetic head 6 of the floppy disc drive 1, a differentiated waveform having a peak corresponding to the reverse in the data is generated as shown in FIG. 5-(B) since the magnetic head 6 detects the reverse in the data. In such a case, the change corresponding to the reverse in the data is faster than that of the signal obtained by reading information on the floppy disc 5 as shown in FIG. 3-(E). Accordingly, there is no change in output at a flat portion, that is, the shoulder, which results in generation of the saddle noise.

Additionally, when an IC card is read by the conventional floppy disc drive 1, a reading speed should be constant and the floppy disc drive 1 should be used without changes in an arrangement, since a compensation for data peculiar to the IC card cannot be made by the floppy disc drive 1.

However, when data is read from an IC card by a floppy disc drive using the conventional Modified Frequency Modulation (MFM) method, data output from the IC card has a waveform having a steep peak at a reverse of the data. Accordingly, the read voltage read by the magnetic head of the floppy disc drive has a waveform in which sharp changes occur at the reverse in the data as shown in FIG. 5-(B) and a degree of change at the shoulder is decreased. When such a waveform is differentiated, a saddle noise is generated at the shoulder. If the saddle noise crosses a reference level (0V), such a crossing is detected by the zero-crossing comparator 26. Accordingly, there is a problem in that a pulse which is not present in the original data is generated and such a pulse causes an error in reading the data.

SUMMARY OF THE INVENTION

It is a general object of the present invention to provide an improved and useful data transmission device in which the above-mentioned problems are eliminated.

A more specific object of the present invention is to provide a data transmission device which can read information on a memory medium such as an IC card without changing a structure of a conventional magnetic recording and reproducing apparatus such as a floppy disc apparatus.

In order to achieve the above-mentioned objects, there is provided according to the present invention a data transmission device attachable to a magnetic recording and reproducing apparatus having a recording and reproducing head for recording/reproducing data on/from a predetermined recording medium, the data transmission device adapted to accommodate a memory medium provided with memory elements for storing information therein, the data transmission device reading data stored in the memory medium or writing data in the memory medium via said magnetic recording and reproducing apparatus by being attached to the magnetic recording and reproducing apparatus, the data transmission device comprising:

- an accommodating unit accommodating the memory medium;
- a connector electrically connecting the memory medium to the data transmission device;
- a control circuit controlling a reading operation of data stored in the memory medium;
- a signal input and output unit positioned adjacent to the recording and reproducing head of the magnetic recording and reproducing apparatus when the data transmission device is attached to the magnetic recording and reproducing apparatus; and
- a waveform changing circuit, controlled by said control circuit, for changing a waveform of data read from the memory medium to a waveform which is conformable to a reproduction characteristic of the magnetic recording and reproducing apparatus.

According to the above-mentioned invention, the data read from the memory medium can be transmitted after changing to the waveform applicable to the reproducing characteristic of the magnetic recording and reproducing apparatus. Thus, no distortion is generated in the signal waveform when reproduced by the magnetic recording and reproducing apparatus, and the data from the memory medium can be accurately transmitted.

The data transmission device according to the above-mentioned invention may further comprise a power source which supplies electric power to the control circuit, the signal input and output unit and the waveform changing circuit.

According to this invention, since the power source is incorporated in the data transmission device, there is no need to supply a power from outside, and an operation of the data transmission device is easy.

Additionally, the waveform changing circuit may comprise:

- a clock generating circuit generating a clock having a frequency applicable to a waveform changing operation of said waveform changing circuit;
- a shift register inputting the data read from the memory medium and outputting signals from a plurality of output terminals in synchronization with the clock generated by said clock generating circuit; and
- an output-level changing circuit changing an output level of a signal supplied to the signal input and output unit by summing signals output from the plurality of output terminals.

Accordingly, the signal supplied to the signal input and output unit can be changed to have a desired waveform with a simple structure by sequentially outputting signals from the plurality of output terminals in synchronization with the clock generated by the clock generating circuit and summing the signals output from the output terminals.

Additionally, the signal input and output unit may comprise a magnetic head core which is magnetically connectable to the recording and reproducing head of the magnetic recording and reproducing apparatus.

Accordingly, when the signal input and output unit is a magnetic head core and the magnetic head core is magnetically connected to the recording and reproducing head of the magnetic recording and reproducing apparatus, the data can be transmitted by changing the waveform to one which is applicable to a magnetic characteristic of the recording and reproducing head of the magnetic recording and reproducing apparatus. Thus, no distortion is generated in the signal waveform when the data is reproduced by the magnetic recording and reproducing apparatus, and the data from the memory medium can be accurately transmitted.

Additionally, the memory medium may be an IC card. Accordingly, when the IC card is used as the memory medium, the data can be transmitted by changing the waveform to one which is applicable to a magnetic characteristic of the recording and reproducing head of the magnetic recording and reproducing apparatus. Thus, no distortion is generated in the signal waveform when the data is reproduced by the magnetic recording and reproducing apparatus, and the data from the IC card can be accurately transmitted.

Additionally, the memory medium may be a memory card. Accordingly, when the memory card is used as the memory medium, the data can be transmitted by changing the waveform to one which is applicable to a magnetic characteristic of the recording and reproducing head of the magnetic recording and reproducing apparatus. Thus, no distortion is generated in the signal waveform when the data is reproduced by the magnetic recording and reproducing apparatus, and the data from the memory card can be accurately transmitted.

Additionally, the magnetic recording and reproducing apparatus may be a floppy disc drive, and the data transmission device may have an outside configuration the same as that of a floppy disc cartridge used for the floppy disc drive.

According to this invention, data having a waveform which is changed to be conformable to the reproducing characteristic of the conventional floppy disc drive is supplied to the magnetic recording and reproducing apparatus. Thereby, the data from the memory medium can be transmitted to the conventional floppy disc drive while the conventional floppy disc drive is maintained unchanged.

Other objects, features and advantages of the present invention will become more apparent from the following detailed description when read in conjunction with the accompanying drawings.

BRIEF DESCRIPTION OF THE DRAWINGS

FIG. 5 is a waveform chart of an operation for providing data via the magnetic head of the conventional floppy disc drive;

FIG. 6A is a plan view of a data transmission device according to an embodiment of the present invention;

FIG. 6B is a bottom view of the data transmission device;

FIG. 7 is a block diagram of the data transmission device according to the present invention;

DETAILED DESCRIPTION OF THE PREFERRED EMBODIMENTS

FIG. 6A is a plan view of a data transmission device according to an embodiment of the present invention, and FIG. 6B is a bottom view of the data transmission device.

A description will now be given, with reference to FIGS. 6A and 6B, of a configuration of the data transmission device 100 shown in FIG. 6A.

Figure 1:
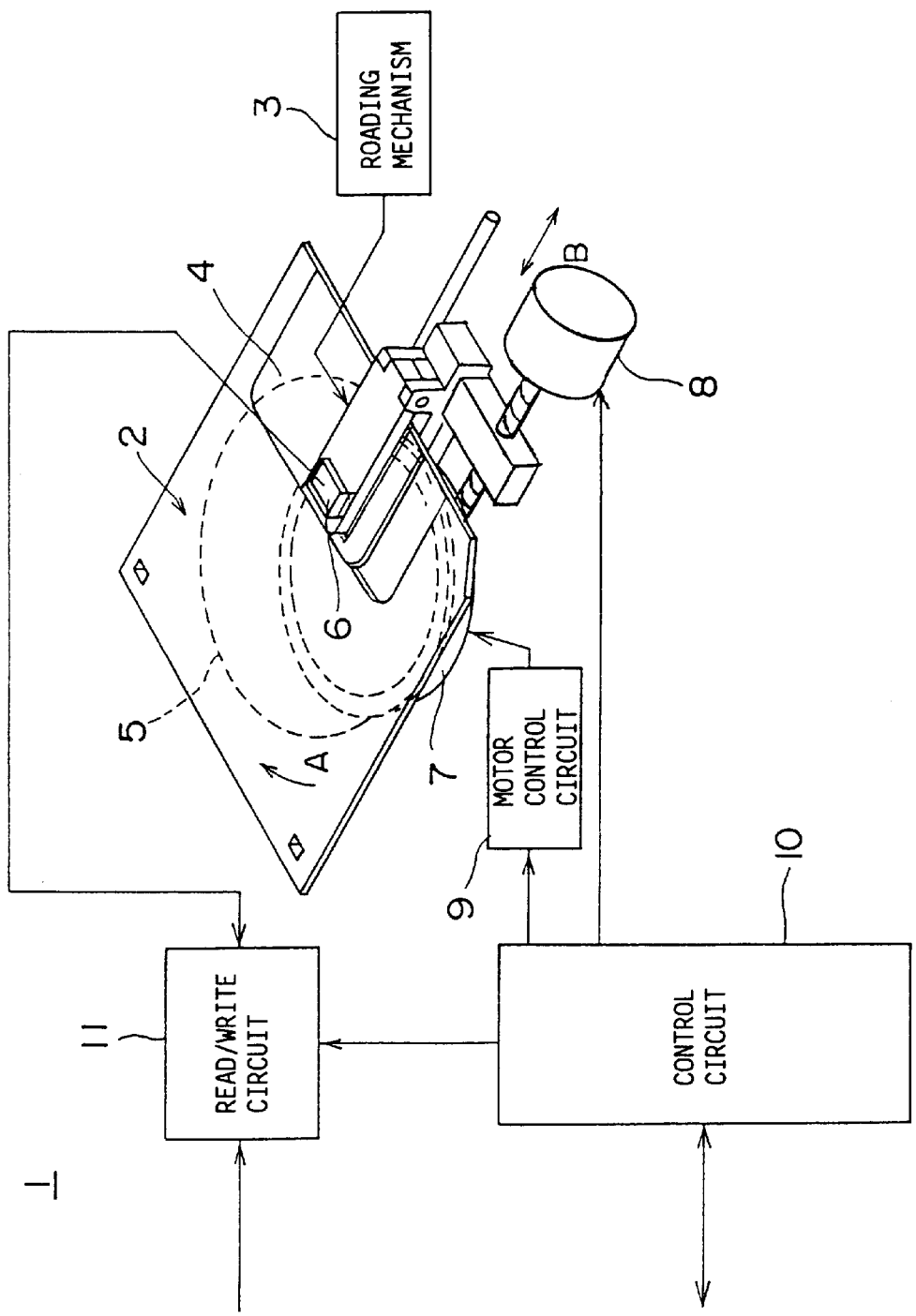
FIG. 1 is a block diagram of a conventional floppy disc drive.
Figure 2:
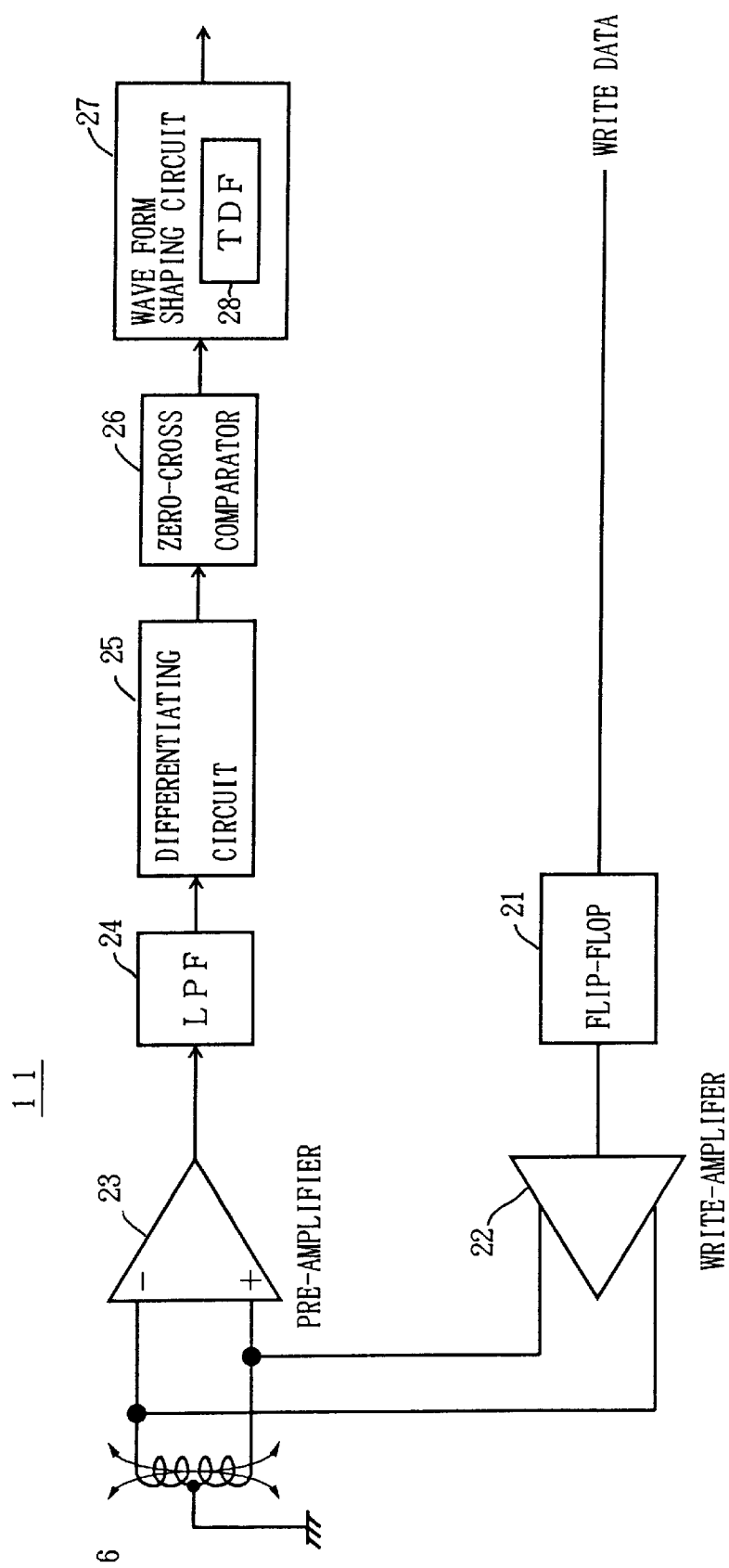
FIG. 2 is a block diagram of a read/write circuit of the conventional floppy disc drive.
Figure 3:
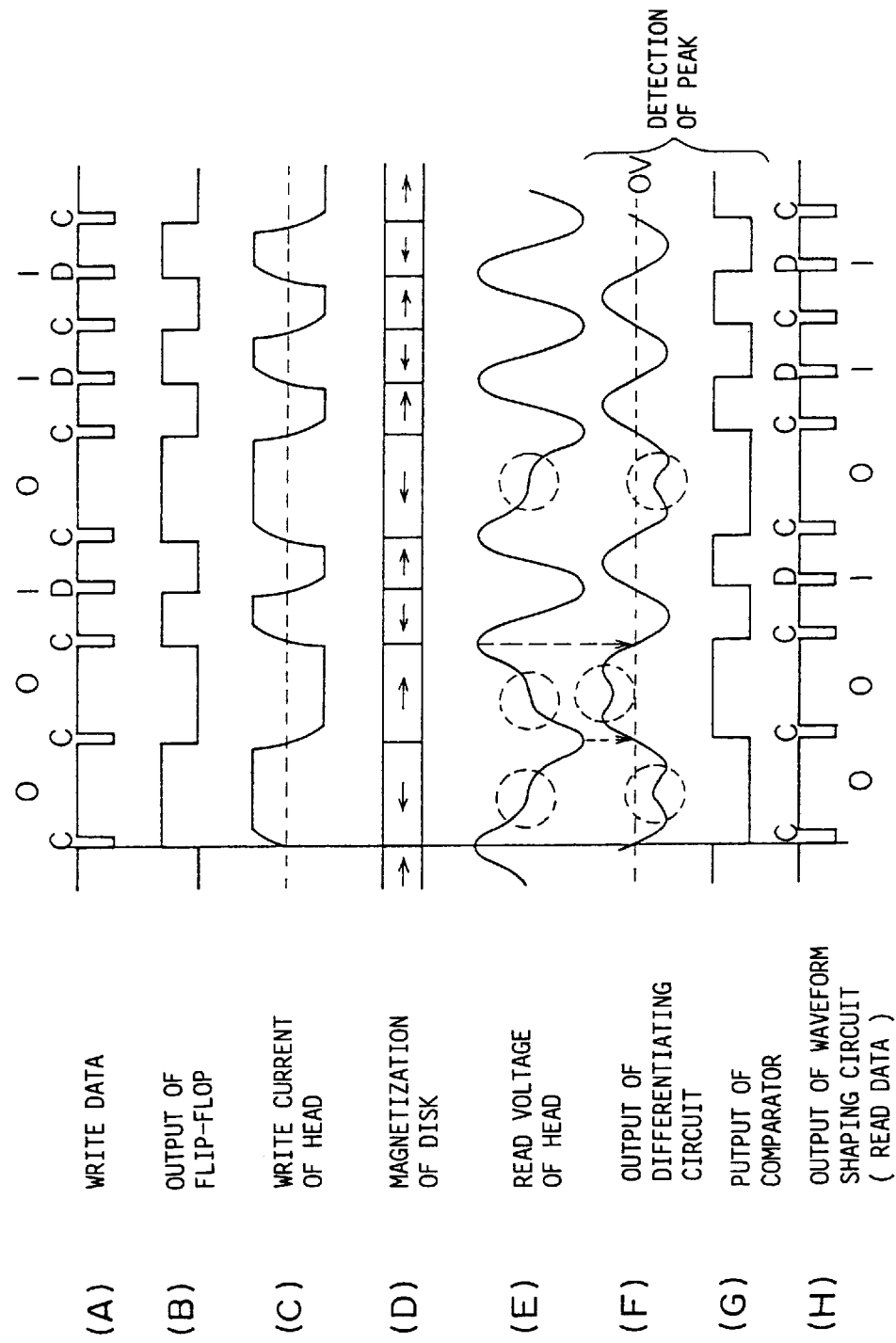
FIG. 3 is a waveform chart of an operation of the read/write circuit of the conventional floppy disc drive.
Figure 4:
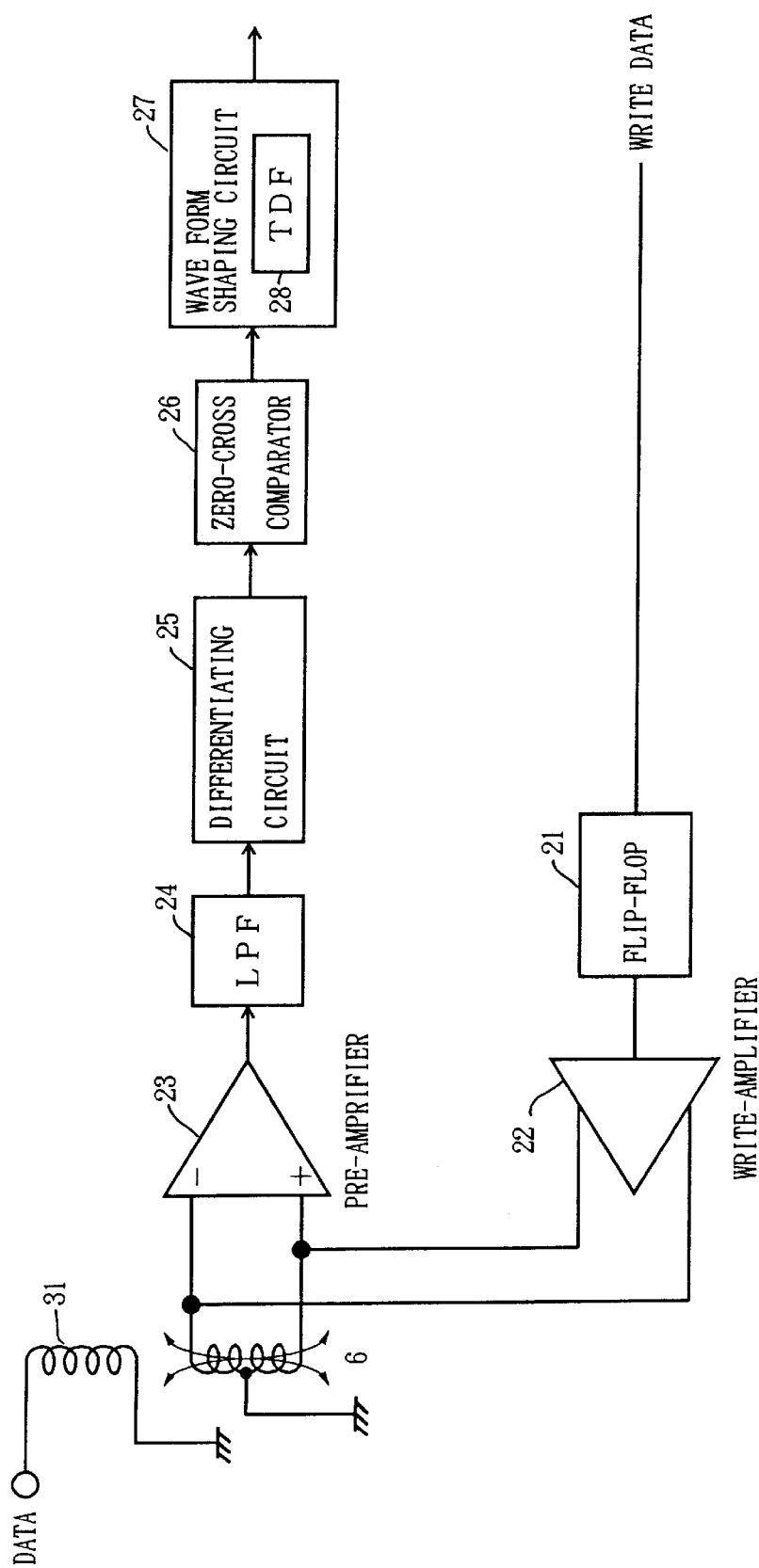
FIG. 4 is a block diagram of a structure for providing data via a magnetic head of the conventional floppy disc drive.

The data transmission device 100 according to the present invention has the same outside configuration as the conventional floppy disc 2, and is used by being attached to the conventional floppy disc drive 1 shown in FIG. 1 similar to the floppy disc 2.

An IC card 200 is inserted into an IC card loading part 101 (indicated by single dashed chain line in FIG. 6B) of the data-transmission device 100 as indicated by dashed lines in FIG. 6B. A slot 102 communicating with the IC card loading part 101 is formed on one of the sides of the data transmission device 100. The IC card 200 is inserted into the IC card loading part 101 through the slot 102 and accommodated in the data transmission device 100.

A contact part 201 is formed on the IC card 200 at a predetermined position so as to input data to the IC card 200 or output data from the IC card 200. On the other hand, an IC contact unit 106 is formed at a position opposite to the contact part 201 of the IC card 200 when the IC card is inserted into the IC card loading part 101.

The IC card 200 is electrically connected to the data transmission device 100, when the IC card 200 is inserted into the IC card loading part 101 of the data transmission device 100, by the contact part 201 making contact with the IC contact unit 106.

Additionally, an engaging hole 103 is formed on a bottom surface of the data transmission device 100, as shown in FIG. 6B, so that the engaging hole 103 is engaged with a spindle hub of a spindle motor when the IC card 200 is loaded in a predetermined loading position in the floppy disc drive 1. When the engaging hole 103 engages the spindle hub of the spindle motor, the data transmission device 100 is positioned at the predetermined loading position in the floppy disc drive 100.

Additionally, a magnetic head core unit 104 is formed on a top surface of the data transmission device 100 as shown in FIG. 6A. the magnetic head core unit 104 contacts the magnetic head at a position "00" when the IC card 200 is loaded at the predetermined loading position in the floppy disc drive 1. The data transmission device 100 is magnetically connected to the floppy disc drive 1 by the magnetic head core unit contacting the magnetic head of the floppy disc drive when the data transmission device 100 is loaded in the predetermined loading position.

Additionally, a battery cell 107 is accommodated in the data transmission device 100 as a drive power source for driving circuits provided in the data transmission device. The data transmission device 100 is electrically driven by a power supplied by the battery cell 107 so as to process signals so that the electrical connection with the IC card 200 and the magnetic connection with the floppy disc drive 1 are provided. As for the battery cell 107, for example, a thin-type manganese dioxide lithium cell may be used.

Additionally, a removal opening 105 is formed on the bottom surface of the data transmission device 100. The removal opening 105 has an oblong shape of which a longitudinal axis aligns with the direction of insertion of the IC card 200, and is used for removing the IC card 200 loaded in the IC card loading part 101. Accordingly, the IC card 200 can be freely removed from the data transmission device 100.

FIG. 7 is a block diagram of the data transmission device 100 according to the embodiment of the present invention. In FIG. 7, parts that are the same as the parts shown in FIG. 6A are given the same reference numerals, and descriptions thereof will be omitted.

The IC contact unit 106, which contacts the contact part 201 to achieve an electrical connection with the IC card 200, is connected to a signal processing circuit unit 111. The signal processing circuit unit 111 comprises a CPU and gate arrays, and serves as an interface with the IC card 200.

A signal read from the IC card 200 is processed by the signal processing circuit unit 111, and then provided to a signal output circuit unit 112. The signal output circuit unit 112 supplies the signal processed by the signal processing circuit unit 111 to the magnetic head core unit 104 by shaping the signal to have a waveform which corresponds to a characteristic of the floppy disc drive 1.

Additionally, a signal supplied from the floppy disc drive 111 to the magnetic head core unit 104 is supplied to the signal processing circuit unit 111, and the signal is converted in to a signal which is writable on the IC card 200 and supplied to the IC contact unit 106.

Electric power is supplied from the battery cell 107 to the signal processing circuit 111, the signal output circuit unit 112 and a clock generating circuit unit 113. The signal processing circuit unit 111 processes signals by electric power supplied by the battery cell 107. The signal output circuit unit 112 shapes waveform of signals by electric power supplied by the battery cell 107. The clock generating circuit unit 113 is driven by electric power supplied by the battery cell 107 so as to generate a desired clock, and the clock is supplied to the signal processing circuit unit 111 and the signal output circuit unit 112.

A description will now be given, with reference to FIG. 8, of a structure of the signal output circuit unit 112.

Figure 8:
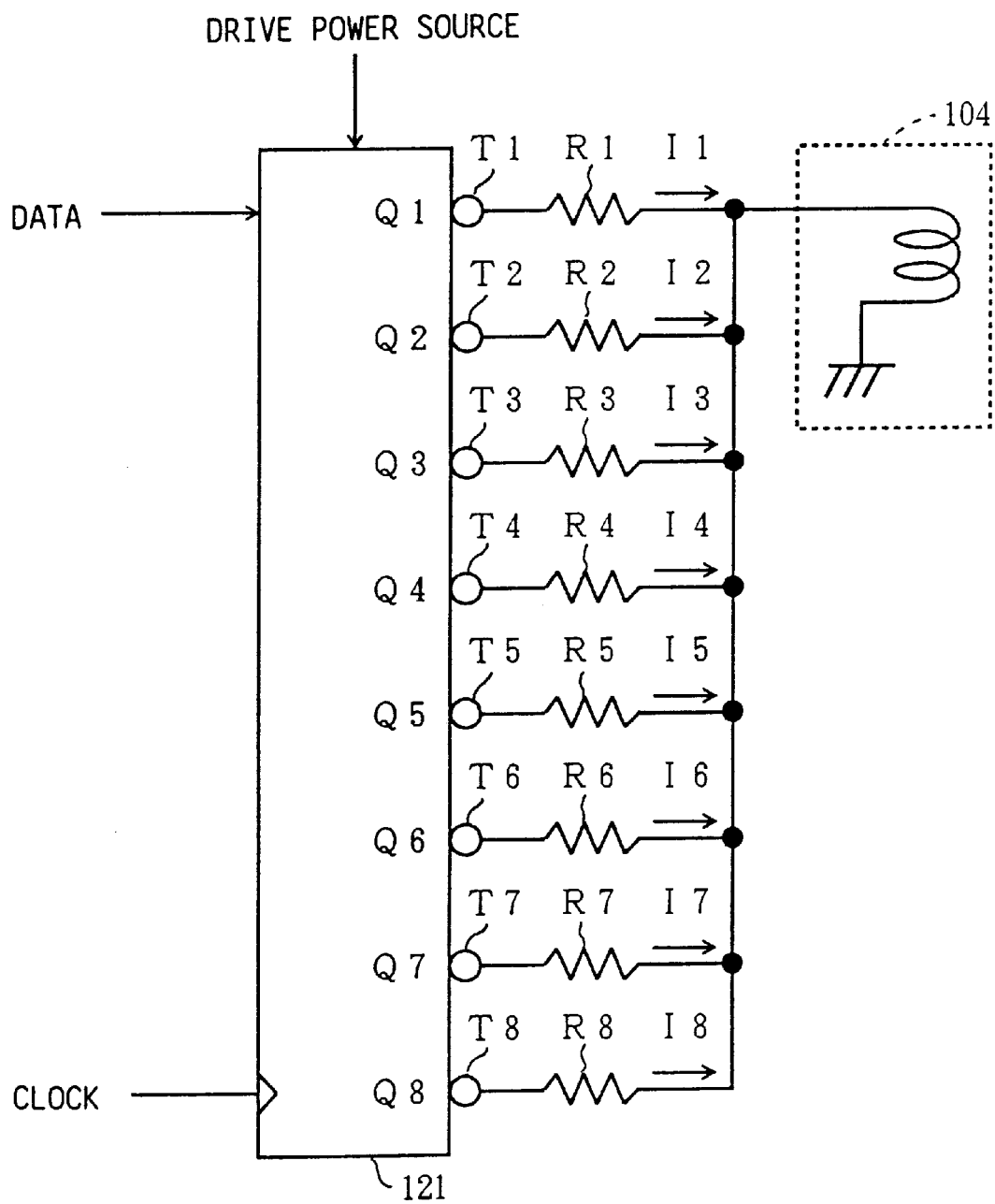
FIG. 8 is a block diagram of a signal output circuit unit of the data transmission device according to the present invention.

FIG. 8 is a block diagram of the signal output circuit unit 112.

The signal output circuit unit 112 comprises a shift register 121 and resistors RI to R8. The signal processed by the signal processing circuit unit 111 and the clock generated by the clock generating circuit unit 113 are provided to the shift register 121. The shift register is driven by electric power provided by the battery cell 107.

The shift register 121 outputs the signals processed by the signal processing circuit unit 111 from eight output terminals T1 to T8 by sequentially shifting the signals in synchronization with the clock supplied by the clock signal generating circuit 113. The output terminal T1 of the shift register 121 is connected to the magnetic head core unit 104 via the resistor R1. The output terminal T2 of the shift register 121 is connected to the magnetic head core unit 104 via the resistor R2. Similarly, each of the output terminals T3 to T8 of the shift register 121 is connected to the magnetic head core unit 104 via the respective one of the resistors R3 to R8.

In the resistors R1 to R8, the resistor R1 and the resistor R8 are set to have the same resistance; the resistor R2 and the resistor R7 are set to have the same resistance; the resistor R3 and the resistor R6 are set to have the same resistance; and the resistor R4 and the resistor R5 are set to have the same resistance. In the present embodiment, the resistor R1 and the resistor R8 are set to 44 kΩ; the resistor R2 and the resistor R7 are set to 22 kΩ; the resistor R3 and the resistor R6 are set to 15 kΩ; and the resistor R4 and the resistor R5 are set to 10 kΩ.

A description will now be given, with reference to FIG. 9, of an operation of the signal output circuit unit 112.

Figure 9:
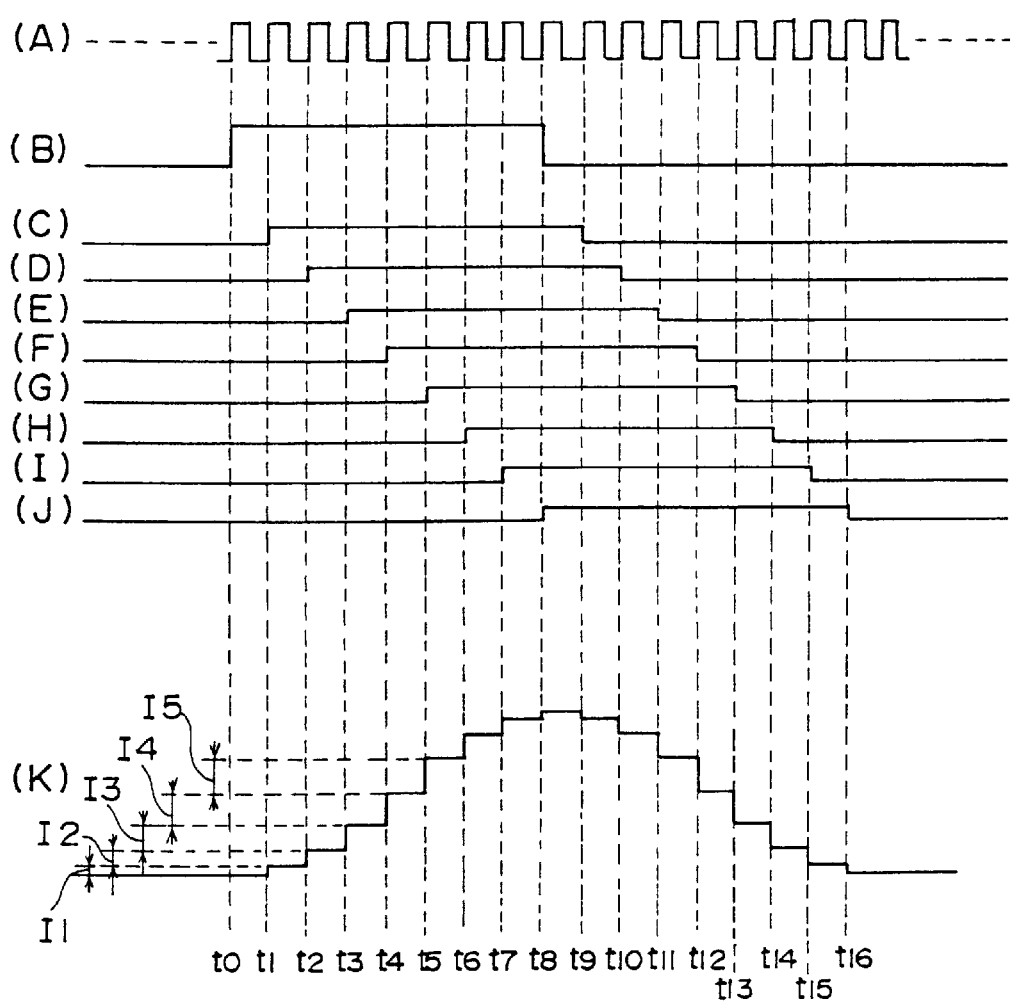
FIG. 9 is a waveform chart of an operation of the signal output circuit.

FIG. 9 is a waveform chart of an operation of the signal output circuit 112. FIG. 9-(A) shows a clock supplied from the clock generating circuit unit 113 to the signal output circuit unit 112; FIG. 9-(B) shows data supplied from the signal processing circuit unit 111 to the signal output circuit unit 112; FIG. 9-(C) shows an output signal Q1 output from the output terminal T1 of the shift register 121; FIG. 9-(D) shows an output signal Q2 output from the output terminal T2 of the shift register 121; FIG. 9-(E) shows an output signal Q3 output from the output terminal T3 of the shift register 121; FIG. 9-(F) shows an output signal Q4 output from the output terminal T4 of the shift register 121; FIG. 9-(G) shows an output signal Q5 output from the output terminal T5 of the shift register 121; FIG. 9-(H) shows an output signal Q6 output from the output terminal T6 of the shift register 121; FIG. 9-(I) shows an output signal Q7 output from the output terminal T7 of the shift register 121; FIG. 9-(J) shows an output signal Q8 output from the output terminal T8 of the shift register 121; and FIG. 9-(K) shows a waveform of an output current of the signal output circuit unit 112.

When the data supplied from the signal processing circuit unit 111 is raised from a low level to a high level at a time t0 as shown in FIG. 9-(B), the output signal Q1 of the output terminal T1 is raised to the high level at a time t1 which corresponds to a time of rising of a subsequent clock.

The output signal Q1 shown in FIG. 9-(C) is output to the magnetic head core unit 104 via the resistor R1. At this time, since the resistor R1 is set to a relatively large value, the output current I1 supplied to the magnetic head core unit 104 is limited by the resistor R1.

Thereafter, the output signal Q2 of the terminal T2 is raised to the high level at a time t2 which corresponds to a time of rising of a subsequent clock.

The output signal Q2 shown in FIG. 9-(D) is output to the magnetic head core unit 104 via the resistor R2. At this time, since the resistor R2 is set to a value smaller than that of the resistor R1, the current I2 supplied to the magnetic head core unit 104 via the resistor R2 is reduced by the resistor R2 to a value greater than the current I1. At this time, since the current I1 has already been output from the output terminal T1, the current supplied to the magnetic head core unit 104 is a sum (I1+I2) of the current I1 and the current I2.

Thereafter, the output signal Q3 of the output terminal T3 is raised to the high level at a time t3 which corresponds to a time of rising of a subsequent clock.

The output signal Q3 shown in FIG. 9-(E) is output to the magnetic head core unit 104 via the resistor R3. At this time, since the resistor R3 is set to a value smaller than that of the resistor R2, the current I3 supplied to the magnetic head core unit 104 via the resistor R3 is reduced by the resistor R3 to a value greater than the current I2. At this time, since the currents Ii and I2 have already been output from the output terminals T1 and T2, the current supplied to the magnetic head core unit 104 is a sum (I1+I2+I3) of the currents I1, I2 and I3.

Thereafter, the output signal Q4 of the output terminal T4 is raised to the high level at a time t4 which corresponds to a time of rising of a subsequent clock.

The output signal Q4 shown in FIG. 9-(F) is output to the magnetic head core unit 104 via the resistor R4. At this time,
since the resistor R4 is set to a value smaller than that of the resistor R3, the current I4 supplied to the magnetic head core unit 104 via the resistor R4 is reduced by the resistor R4 to a value greater than the current I3. At this time, since the currents I1, I2 and I3 have already been output from the output terminals T1, T2 and T3, the current supplied to the magnetic head core unit 104 is a sum (I1+I2+I3+I4) of the currents I1, I2, I3 and I4.

Thereafter, the output signal Q5 of the output terminal T5 is raised to the high level at a time t5 which corresponds to a time of rising of a subsequent clock.

The output signal Q5 shown in FIG. 9-(G) is output to the magnetic head core unit 104 via the resistor R5. At this time, since the resistor R5 is set to a value equal to that of the resistor R4, the current I5 supplied to the magnetic head core unit 104 via the resistor R5 is reduced by the resistor R5 to a value equal to the current I4. At this time, since the currents I1, I2, I3 and I4 have already been output from the output terminals T1, T2, T3 and T4, the current supplied to the magnetic head core unit 104 is a sum (I1+I2+I3+I4+I5) of the currents I1, I2, I3, I4 and I5.

Similarly, the current supplied to the magnetic head core unit 104 is sequentially increased at times t6 to t8 as (I1+I2+I3+I4+I5+I6), (I1+I2+I3+I4+I5+I6+I7), (I1+I2+I3+I4+I5+I6+I7+I8).

As mentioned above, the values of the resistors R1 to R8 are set so as to satisfy the relationship R1>R2>R3>R4 and each pair of the resistors R1 and R8, R2 and R7, R3 and R6 and R4 and R5 is set to be the same value. Thus, the current supplied to the magnetic head core unit 104 has a waveform which gently changes at a bottom and a top as shown in FIG. 9-(K).

Additionally, after the data supplied by the signal processing circuit unit 111 is lowered at the time t8 from the high level to the low level as shown in FIG. 9(B), the output signals Q1 to Q8 of the output terminals T1 to T8 sequentially fall as shown in FIG. 9-(C) to (J). Accordingly, the current supplied to the magnetic head core unit 104 has a waveform which gently falls from the time t9 to the time t16 similar to the rising from the time t1 to the time t8.

Accordingly, the square wave shown in FIG. 9-(B) can be shaped into the gently changing wave as shown in FIG. 9-(K).

A description will now be given, with reference to FIG. 10, of an operation of the floppy disc drive used with the data transmission device 100 according to the present embodiment.

Figure 10:
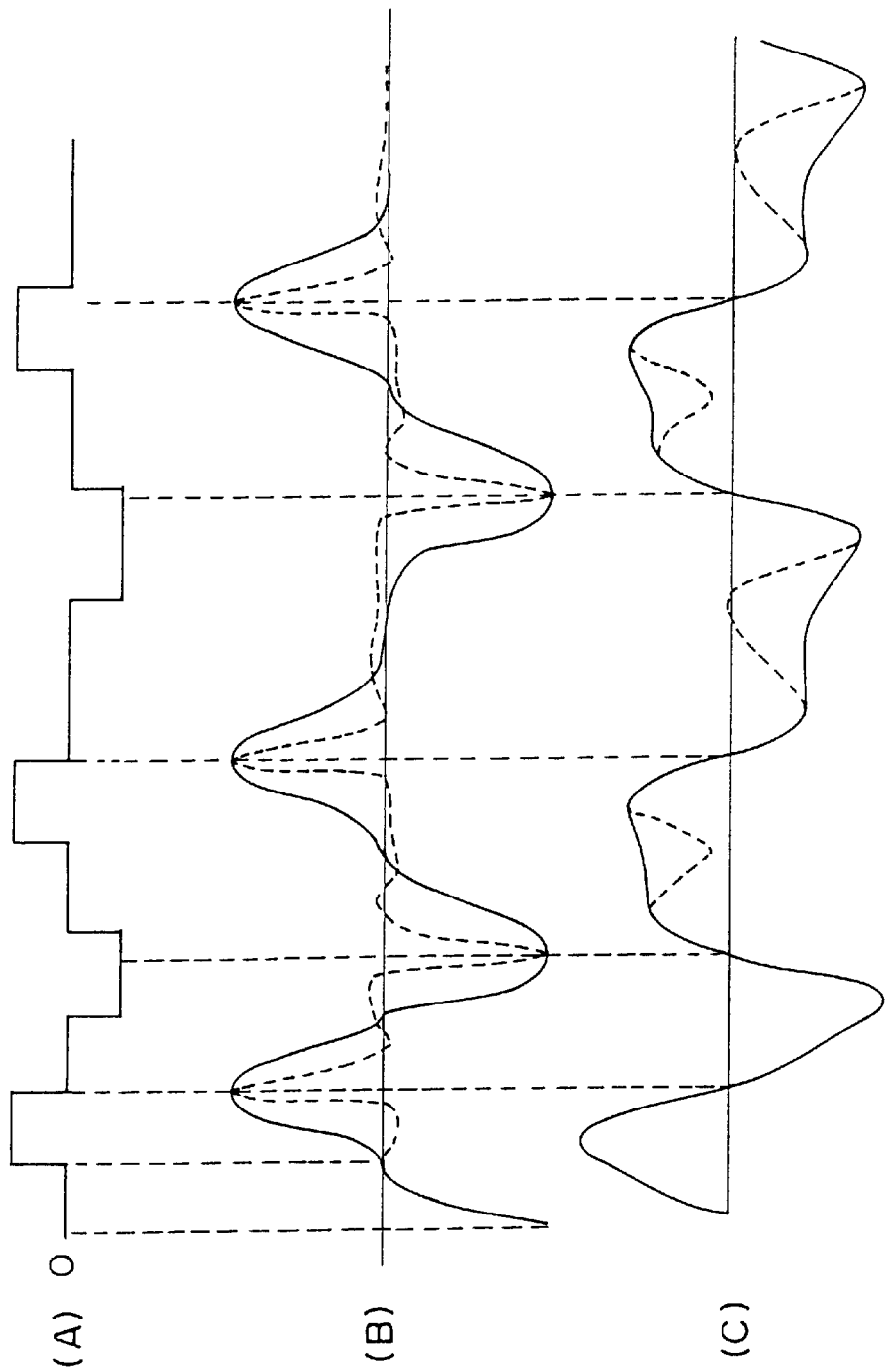
FIG. 10 is a waveform chart of a reproducing operation performed by a floppy disc drive used with the data transmission device according to the present invention.

FIG. 10 is a waveform chart of an operation of the floppy disc drive 1 used with the data transmission device 100 according to the present invention. FIG. 10-(A) shows the signal supplied from the signal processing circuit unit 111 to the signal output circuit device 112 in the data transmission device 100; FIG. 10-(B) shows an output waveform of the amplifier of the floppy disc drive 1; and FIG. 10-(C) shows an output waveform of the differentiating circuit of the floppy disc drive 1.

The signal shown in FIG. 10-(A), which is a square wave, is shaped into a gentle waveform as shown in FIG. 9-(K) by the signal output circuit unit 112. Thus, the waveform of the signal read by the magnetic head of the floppy disc drive 1 is approximate to the waveform of the signal of the floppy disc 2 which is read by the magnetic head.

Accordingly, the waveform of the signal amplified by the amplifier of the floppy disc drive 1 is different from the waveform obtained by directly reading the square wave as indicated by a dashed line in FIG. 10-(B). That is, the amplified waveform becomes a gentle waveform indicated by a solid line shown in FIG. 10-(B). Accordingly, the waveform indicated by the solid line in FIG. 10-(B) does not have a flat portion near a zero-crossing point. Thus, when the waveform indicated by the solid line shown in FIG. 10-(B) is differentiated, an unchanging output near the zero-crossing point can be suppressed, and, thereby, a saddle noise indicated by dashed lines shown in FIG. 10-(C) can be suppressed, which results in an output of a differentiated waveform indicated by a solid line of FIG. 10-(C). Thus, an unnecessary zero-crossing does not occur.

As mentioned above, the data transmission device of the present embodiment can perform a stable and accurate reading operation of information stored in a memory card by using a floppy disc drive since the saddle noise is suppressed.

The present invention is not limited to the specifically disclosed embodiments, and variations and modifications may be made without departing from the scope of the present invention.

The present application is based on Japanese priority application No. 9-249005 filed on Sep. 12, 1997, the entire contents of which are hereby incorporated by reference.

What is claimed is:

1. A data transmission device attachable to a magnetic recording and reproducing apparatus having a recording and reproducing head for recording/reproducing data on/from a predetermined recording medium, said data transmission device accommodating a memory medium provided with memory elements for storing information therein, said data transmission device reading/writing data stored in said memory medium via said magnetic recording and reproducing apparatus by being attached to said magnetic recording and reproducing apparatus, said data transmission device comprising:

an accommodating unit accommodating said memory medium;

a connector electrically connecting said memory medium to said data transmission device;

a control circuit controlling a reading operation of data stored in said memory medium;

a signal input and output unit positioned adjacent to said recording and reproducing head of said magnetic recording and reproducing apparatus when said data transmission device is attached to said magnetic recording and reproducing apparatus; and a waveform changing circuit, controlled by said control circuit, for changing a waveform of data read from said memory medium to a waveform which is conformable to a reproduction characteristic of said magnetic recording and reproducing apparatus.

2. The data transmission device as claimed in claim 1, further comprising a power source which supplies electric power to said control circuit, said signal input and output unit and said waveform changing circuit.

3. The data transmission device as claimed in claim 1, wherein said waveform changing circuit comprises:

a clock generating circuit generating a clock having a frequency applicable to a waveform changing operation of said waveform changing circuit;

a shift register inputting the data read from said memory medium and outputting signals from a plurality of output terminals in synchronization with the clock generated by said clock generating circuit; and an output-level changing circuit changing an output level of a signal supplied to said signal input and output unit by summing signals output from said plurality of output terminals.

4. The data transmission device as claimed in claim 1, wherein said signal input and output unit comprises a magnetic head core which is magnetically connectable to said recording and reproducing head of said magnetic recording and reproducing apparatus.

5. The data transmission device as claimed in claim 1, wherein said memory medium is an IC card.

6. The data transmission device as claimed in claim 1, wherein said memory medium is a memory card.

7. The data transmission device as claim in claim 1, wherein said magnetic recording and reproducing apparatus is a floppy disc drive, and said data transmission device has an outside configuration the same as that of a floppy disc cartridge used for said floppy disc drive.

* * * * *